United States Patent [19]

Kawabe et al.

[11] Patent Number: 5,287,907
[45] Date of Patent: Feb. 22, 1994

[54] METHOD AND APPARATUS FOR ASSEMBLING TIRE AND WHEEL AND FILLING INNER PRESSURE

[75] Inventors: Hiroshi Kawabe; Toshiyuki Watanabe; Naotaka Tomita, all of Tokyo, Japan

[73] Assignee: Bridgestone Corporation, Tokyo, Japan

[21] Appl. No.: 935,172

[22] Filed: Aug. 26, 1992

[30] Foreign Application Priority Data

Aug. 27, 1991 [JP] Japan .................. 3-238939

[51] Int. Cl.$^5$ .............................. B60C 25/10
[52] U.S. Cl. ........................ 157/1; 157/1.24
[58] Field of Search .............. 157/1.1, 1.0, 1.17, 157/1.2, 1.22, 1.24, 1.26, 1.28

[56] References Cited

U.S. PATENT DOCUMENTS

| | | |
|---|---|---|
| 2,903,029 | 9/1959 | Twiford . |
| 2,925,837 | 2/1960 | Twiford . |
| 4,765,387 | 8/1988 | Mannen . |
| 4,884,611 | 12/1989 | Schmidt . |

FOREIGN PATENT DOCUMENTS 0493073 7/1992 European Pat. Off. .
61-47722 10/1986 Japan .

Primary Examiner—D. S. Meislin
Attorney, Agent, or Firm—Sughrue, Mion, Zinn, Macpeak & Seas

[57] ABSTRACT

A method for assembling a tire on the rim of a wheel and filling inner pressure in the tire. The wheel is fixed on a wheel table in an airtight manner to the table. The tire is arranged on the wheel and a pawl is moved along the circumference of the wheel or the wheel on the table is rotated to arrange the bead portions of the tire around the rim of the wheel. An outer cylinder member is brought into abutment against one of the bead portions to urge it toward the other bead portion and pressurized air is filled into the tire through a clearance between the wheel and the one bead portion of the tire to bring the bead portions into close contact with the rim of the wheel. Thereafter, pressurized air is further filled in the tire through the inflation valve of the wheel to maintain the inner pressure higher than the normal inner pressure and then the inner pressure is lowered to the normal inner pressure.

4 Claims, 13 Drawing Sheets

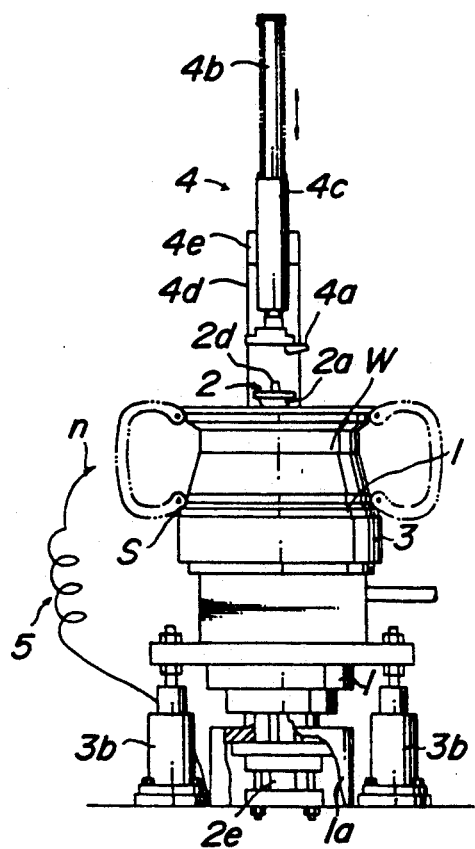
FIG_1a
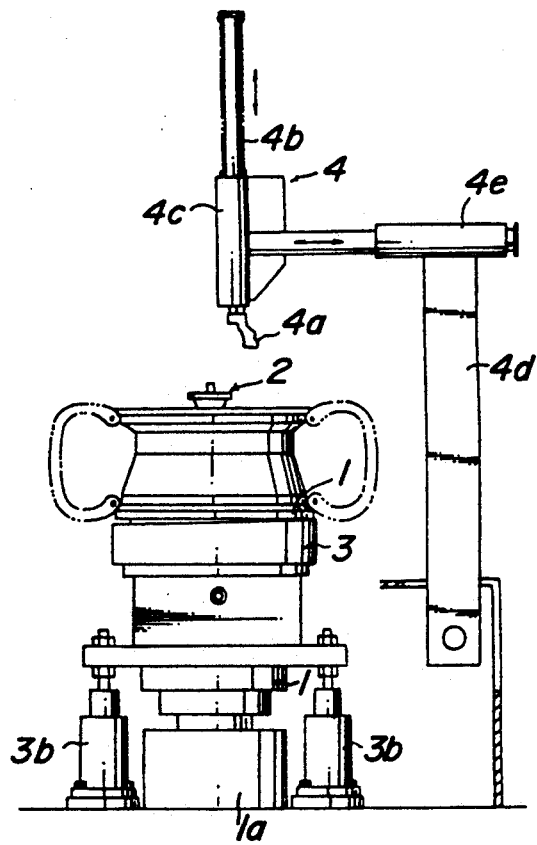
FIG_1b

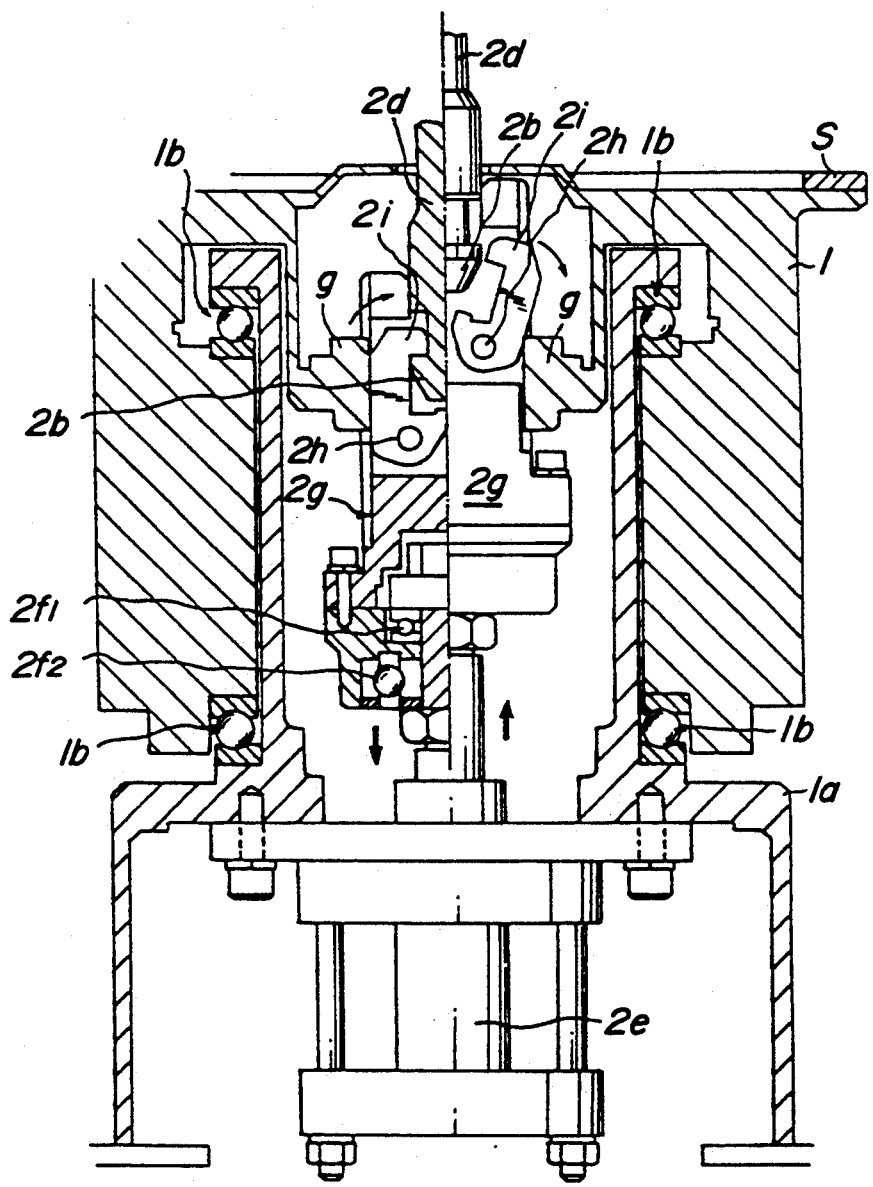
FIG_2

FIG_4

FIG_6

FIG_8

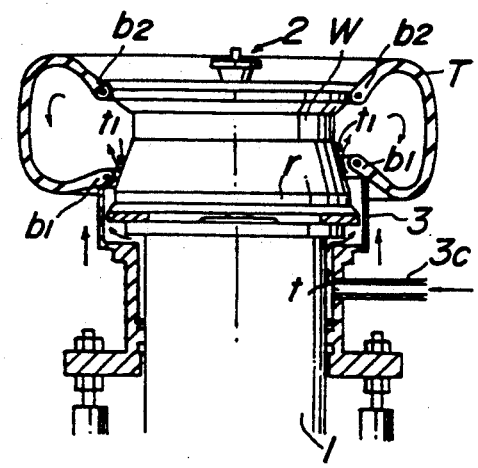
FIG_10
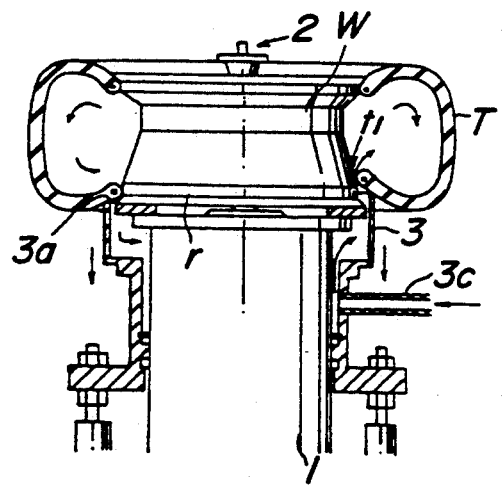
FIG_11
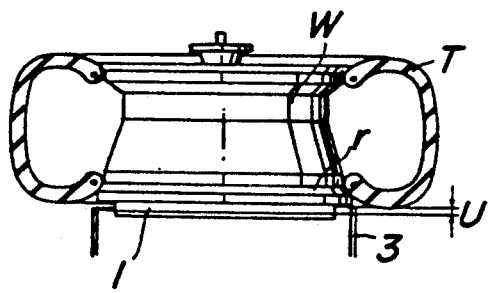
FIG_12

METHOD AND APPARATUS FOR ASSEMBLING TIRE AND WHEEL AND FILLING INNER PRESSURE

BACKGROUND OF THE INVENTION

This invention relates to a method and an apparatus for assembling a tire on the rim of a wheel without damaging the bead portions of the tire and the inside and the outer circumferential surface of the wheel, while at the same time filling the tire with inner pressure.

An apparatus for assembling a tire on the rim of a wheel has been known as disclosed in Japanese Utility Model Application Laid-open No. 50-104,302. With this prior art apparatus, the wheel is arranged on a table vertically movable and fixed thereat by means of an extensible and contractible center cone inserted into the hub hole formed in the center of the wheel. The tire is then arranged on the wheel so that part of one bead portion of the tire is loosely arranged around the well of the wheel. By rotating revolving arms coaxially provided on the center cone, bead portions of the tire are radially outwardly expanded by guide rollers provided on the outer ends of the revolving arms, and at the same time a side surface rubber of the tire is urged downwardly by restraining rollers also vertically movably provided on the revolving arms. As a result, the bead portions of the tire are arranged around the wheel.

On the other hand, an inner pressure filling apparatus was disclosed in Japanese Utility Model Application Laid-open No. 64-16,404, in which one bead portion of a tire mounted on the rim of a wheel is urged from the side not being fixed toward the other bead portion to form a clearance between the bead portion and the wheel, through which clearance pressurized air is supplied into the tire.

In assembling a tire on a wheel by the use of the apparatus of the prior art described above, however, the bead portions of the tire are subjected to excessive external forces to be unduly deformed. The deformed bead portions detrimentally affect the close contact between the wheel and the bead portions to lower the tire uniformity and sealing performance so that the inherent performance of the tire mounted on the wheel could not be exhibited. In the worst case, moreover, there is often a risk of the deformed bead portions being damaged in assembling the tire on the wheel.

On the other hand, with the inner pressure filling apparatus of the prior art, the bead portions of the tire are simultaneously brought into close contact with bead seats of the wheel. In order to obtain forces to cause the bead portions to closely contact the bead seats, it is therefore required to make higher the inner pressure of the tire than the normal inner pressure. For example, the inner pressure should be 4 to 6 $kgf/cm^2$, when the normal inner pressure is 3 to 5 $kgf/cm^2$. Moreover, as the table together with the wheel arranged thereon is rapidly lowered in order to fill the inner pressure into the tire with high efficiency, the bead portions are abruptly urged against the rim of the wheel. Therefore, the deformed bead portions of the tire are undesirably mounted in the deformed state on the bead seats of the wheel.

In addition thereto, in the case that tire is assembled on the wheel and then filled with the inner pressure according to the prior art, a tire-rim assembling apparatus and an inner pressure filling apparatus must be separately provided. Therefore, wide spaces are required, which are occupied by such apparatuses. Consequently, a tire-wheel assembling and inner pressure filling apparatus has been expected which can effect the two operations at one position and is compact in construction.

SUMMARY OF THE INVENTION

It is an object of the invention to provide a method for assembling a tire on a wheel and an apparatus for carrying out the method, which can arrange the bead portions of the tire around the rim of the wheel without causing any undue deformation of bead portions of the tire and bring the bead portions into uniformly close contact with the rim of the wheel with relatively slight forces by successively filling inner pressure into the tire.

In order to accomplish this object, the method for assembling a tire and a wheel and filling inner pressure in the tire according to the invention, comprises steps of holding and fixing onto a wheel table the wheel whose one end surface is held in an airtight manner, arranging the tire on the free end remote from the wheel table so that part of one of bead portions of the tire is loosely arranged around the rim of the wheel, arranging a pawl of tire mounting means between the wheel and the one bead portion of the tire, rotating any one of the pawl and the wheel table supporting thereon the wheel relative to the other to relatively move the pawl along the circumference of the wheel so that the bead portions of the tire are progressively radially outwardly expanded to arrange the bead portions around the rim of the wheel along all their circumferences, causing an annular outer cylinder member extendable and retractable toward and away from the tire and having at its forward end an inclined portion for filling inner pressure in the tire to abut against the one bead portion of the tire arranged around the rim of the tire to form a clearance between the wheel and the bead portion, supplying pressurized air into the interior of the tire through the clearance between the wheel and the bead portion, progressively retracting the outer cylinder member from this state away from the tire to bring the bead portions into close contact with bead seats of the wheel, injecting pressurized air into the tire through the inflation valve of the wheel to hold once the inner pressure of the tire higher than the normal pressure, and lowering the inner pressure of the tire to the normal pressure.

Moreover, the apparatus for assembling a tire and a wheel and filling inner pressure into the tire according to the invention, comprises a wheel table for arranging thereon the wheel on which the tire is assembled, the wheel table having rotating means for rotating the wheel table together with the wheel thereon, fixing means for holding and fixing on the wheel table the wheel whose one end surface is held in an airtight manner, an annular outer cylinder member vertically movable and surrounding the wheel table to form clearances between the wheel table and the outer cylinder member and between the wheel and one of bead portions of the tire, through which clearances pressurized air is supplied into the tire, the outer cylinder member having at its end an inclined portion to contact the one bead portion and urge it toward the other bead portion, tire mounting means having a pawl for progressively arrange the bead portions of the tire around the rim of the wheel held and fixed to the wheel table, the tire mounting means having moving means for moving the pawl substantially in vertical and horizontal directions and air injection means for injecting pressurized air through an inflation valve of the wheel.

In a preferred embodiment of the apparatus, the fixing means comprises a taper cone having a taper portion to be fitted in the hub aperture of the wheel and a through-aperture at the center, a fixing rod to be inserted in the through-aperture of the taper cone and having at its front end an engaging portion and at the rear end a stopper to contact the taper cone, and a block rotatably held through a bearing on the operating end of a cylinder arranged on a frame of the wheel table, the block having anchoring pieces pivotally connected thereto for embracing the engaging portion of the fixing rod inserted in the through-aperture of the taper cone.

The invention will be more fully understood by referring to the following detailed specification and claims taken in connection with the appended drawings.

BRIEF DESCRIPTION OF THE DRAWINGS

FIG. 1a is a front view of the apparatus according to the invention;

FIG. 1b is a side view of the apparatus shown in FIG. 1a;

FIG. 2 is a sectional view of principal parts of the apparatus shown in FIG. 1a;

FIG. 3 is a partial sectional view of principal parts of the apparatus shown in FIG. 1a;

FIG. 10 is an explanatory view of the first operation step of the outer cylinder member used in the apparatus according to the invention;

FIG. 11 is an explanatory view of the next operation step of the outer cylinder member shown in FIG. 10;

FIG. 12 is an explanatory view of the further operation step of the outer cylinder member shown in FIG. 10;

DESCRIPTION OF THE PREFERRED EMBODIMENTS

Figure 3:
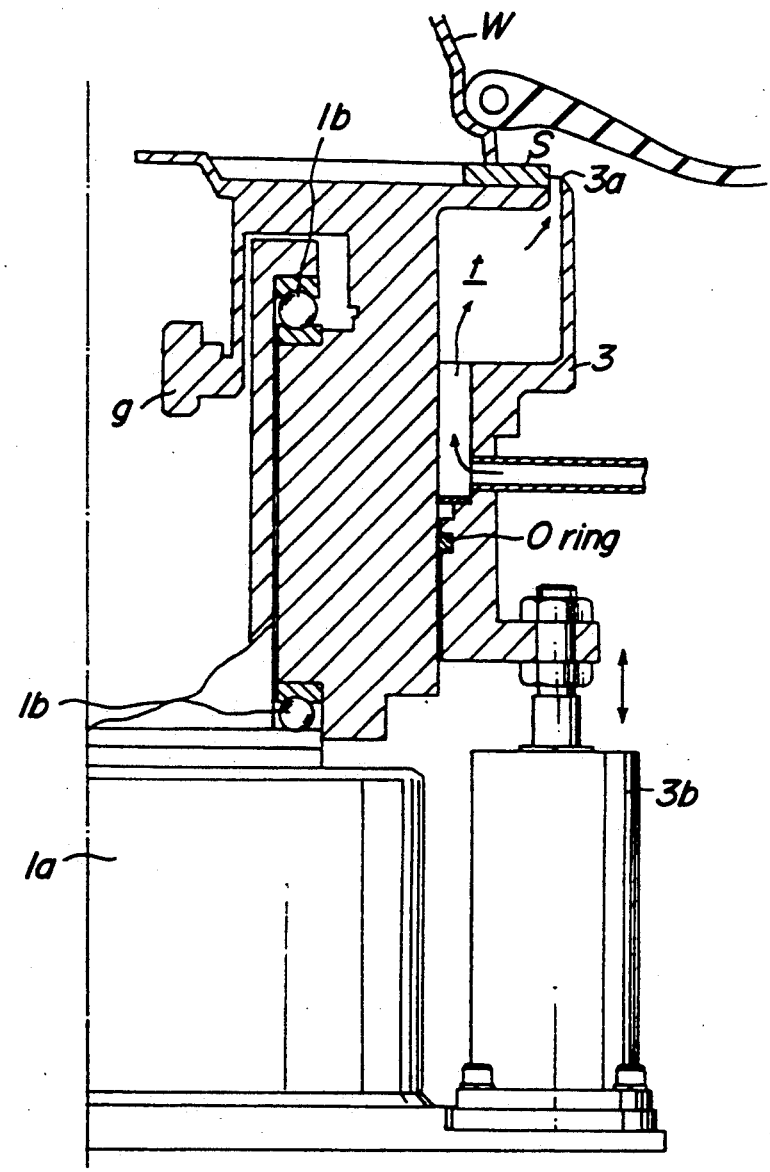

Referring to FIGS. 1a and 1b and FIGS. 2 and 3, a wheel table 1 for arranging thereon a wheel W is rotatably supported on a bearing 1b fitted on a stationary frame 1a (FIG. 2). The wheel W is held and fixed on its one end surface onto the wheel table 1 in an airtight manner through a sealing member such as rubber sheet S by means of fixing means 2. The fixing means 2 comprises a taper cone 2a (FIG. 4) adapted to be fitted in a hub aperture $W_1$ of the wheel W, a fixing rod 2d having at the front end an engaging portion 2b and at the rear end a stopper 2c and adapted to be inserted into the through-aperture h of the taper cone 2a, a cylinder 2e held by and fixed to the stationary frame 1a, and a block 2g rotatably held by the rod end of the cylinder 2e through bearings 2f1 and 2f2 to be able to be raised and lowered along a guide g (shown as an integral construction with a frame of the table 1) by the action of the cylinder 2e.

The block 2g includes at least one pair of anchoring pieces 2i rockably supported by means of pivot pins 2h. At the uppermost position of the block 2g, the anchoring pieces 2i fall down about the pivot pins 2h near to their horizontal positions to permit the vertical movements of the fixing rod 2d inserted through the through-aperture h of the taper cone 2a (refer to the right half in FIG. 2). On the other hand, at the lowermost position of the block 2g, the anchoring pieces 2i rise vertically so as to lock the vertical movements of the fixing rod 2d to fix the wheel W on the wheel table 1 firmly (refer to the left half in FIG. 2).

An annular outer cylinder member 3 surrounds the wheel table 1 so as to form a clearance t with the table 1 (FIG. 3). In filling inner pressure in the tire, the outer cylinder member 3 urges upward one bead portion toward the other bead portion of the tire to form a clearance $t_1$ between the one bead portion and the wheel (FIG. 10). The outer cylinder member 3 thus serves to fill the inner pressure into the tire through the clearances t and $t_1$. For the purpose of urging upward the bead portion of the tire, the outer cylinder member 3 is formed at its upper edge with an inclined portion 3a and moved upward and downward as a whole by means of cylinders 3b, while being kept in an airtight manner with the aid of an O-ring.

Tire mounting means 4 is provided for the purpose of progressively arranging the bead portions of the tire around the rim of the wheel W fixed to the wheel table 1. The tire mounting means 4 comprises a pawl 4a adapted to position between the wheel W and the bead portions of the tire for arranging the bead portions around the rim of the wheel, a vertical arm 4b of, for example, a spring type for holding the pawl 4a, a first pneumatic cylinder 4c for vertically moving the vertical arm 4b together with the pawl 4a, and a second pneumatic cylinder 4e held by a tiltable arm 4d for horizontally moving the first pneumatic cylinder 4c together with the pawl 4a and the vertical arm 4b. Air injection means 5 has a nozzle n for injecting pressurized air into the tire through the inflation valve (not shown) of the wheel W.

Figure 4:
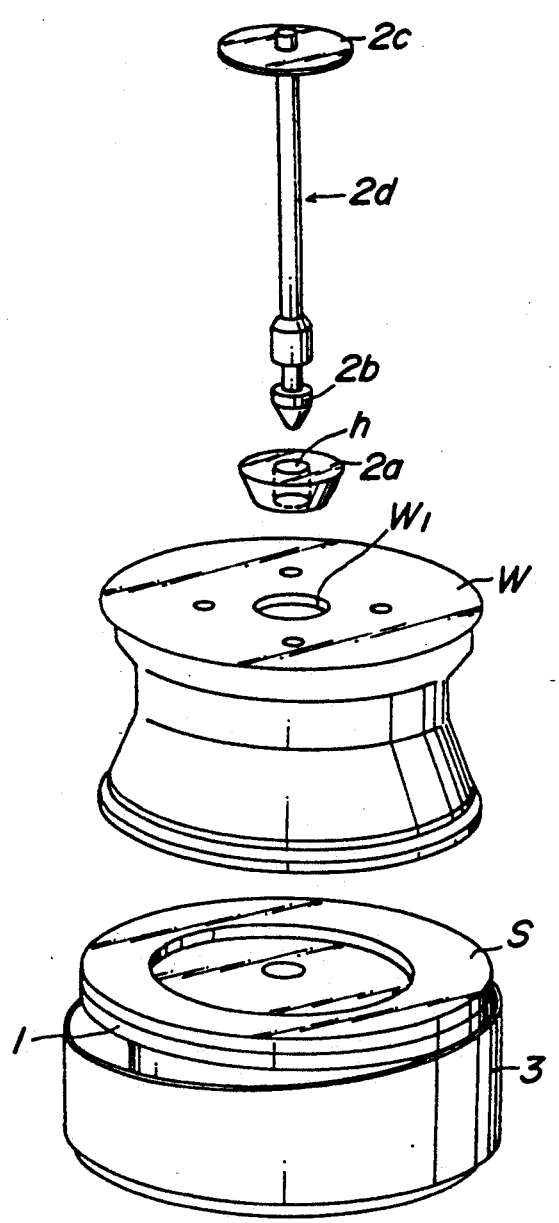
FIG. 4 is an exploded perspective view of the tire mounting means used in the apparatus according to the invention.

FIG. 4 illustrates the table 1, the outer cylinder member 3 surrounding it, the rubber sheet S, the wheel W, and the fixing means 2, particularly its taper cone 2a and the fixing rod 2d to help understanding the relationship between these members.

The procedure for assembling a tire on a wheel and filling inner pressure into the tire will be explained hereinafter.

Figure 5:
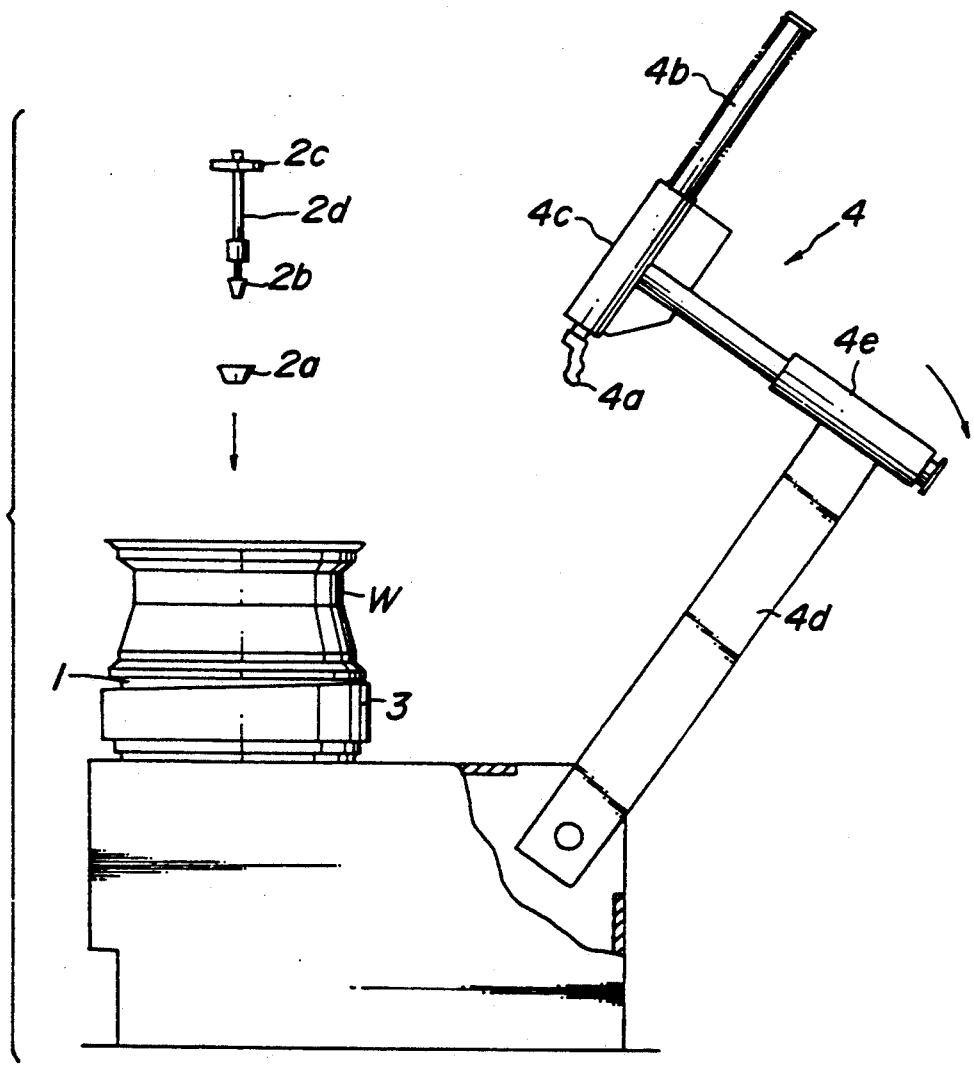
FIG. 5 is an explanatory view of first step of the tire-wheel assembling and inner pressure filling operation according to the invention.

Referring to FIG. 5, first the tiltable arm 4d of the tire mounting means 4 is tilted away from the wheel table 1 and a wheel W is arranged on the wheel table. The taper cone 2a is then arranged in the hub aperture $W_1$ of the wheel W and the fixing rod 2d is inserted into the through-aperture h of the taper cone. The block 2g provided on the rod end of the cylinder 2e has been previously raised in its raised position as shown in the right half of FIG. 2. When the engaging portion 2b at the lower end of the fixing rod 2d has arrived at the anchoring pieces 2i, the cylinder 2e is actuated to lower the block 2g to its lowermost position as shown in the left half of FIG. 2.

In this manner, the the fixing rod 2d is lowered at the position where the stopper 2c at the upper end of the fixing rod 2d abuts against the taper cone 2a. At the moment when the stopper 2c abuts against the taper cone 2a, the wheel W is firmly fixed to the wheel table 1 whose rotating axis is aligned wit the rotating axis of the wheel W.

Figure 6:
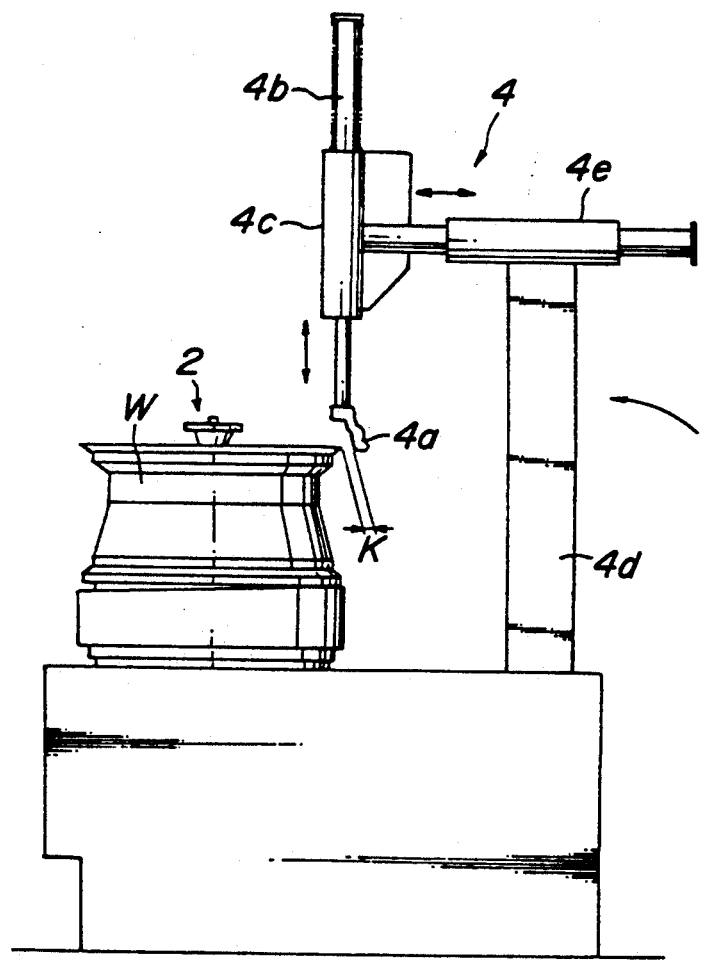
FIG. 6 is an explanatory view of the next step of the tire-wheel assembling and inner pressure filling operation according to the invention.
Figure 7:
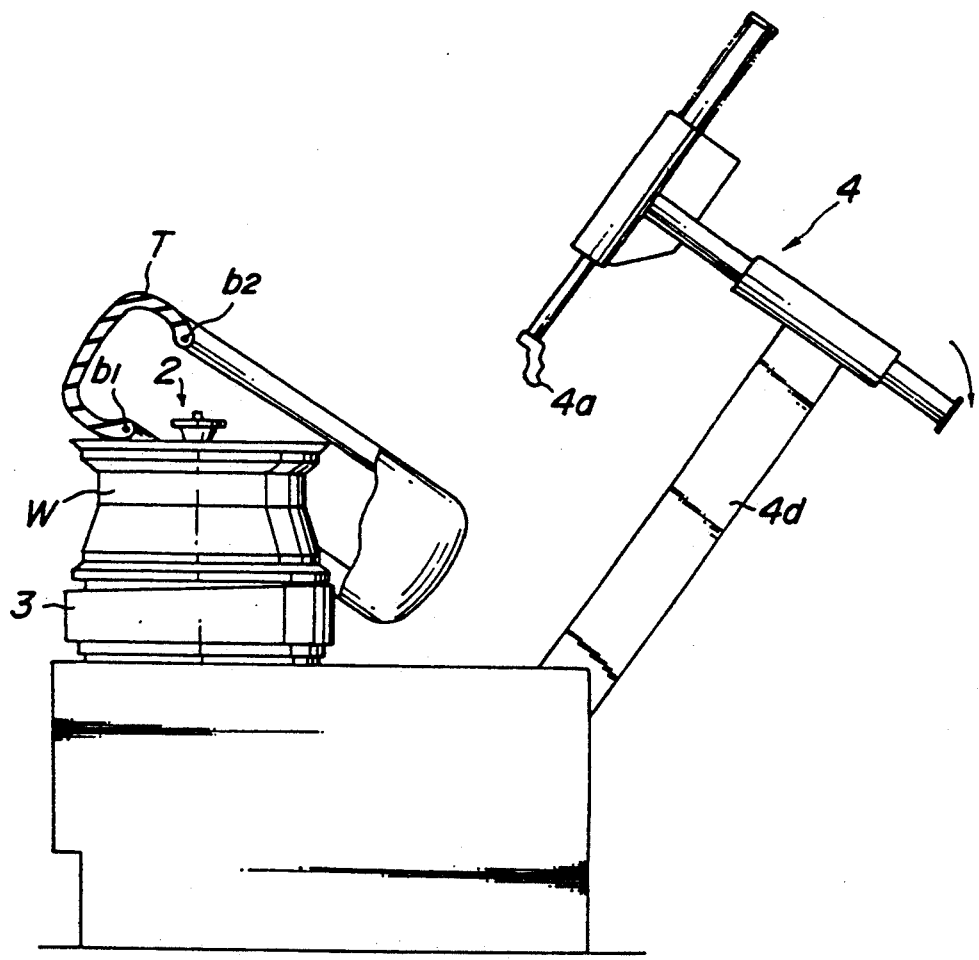
FIG. 7 is an explanatory view of the next step of the tire-wheel assembling and inner pressure filling operation according to the invention.
Figure 8:
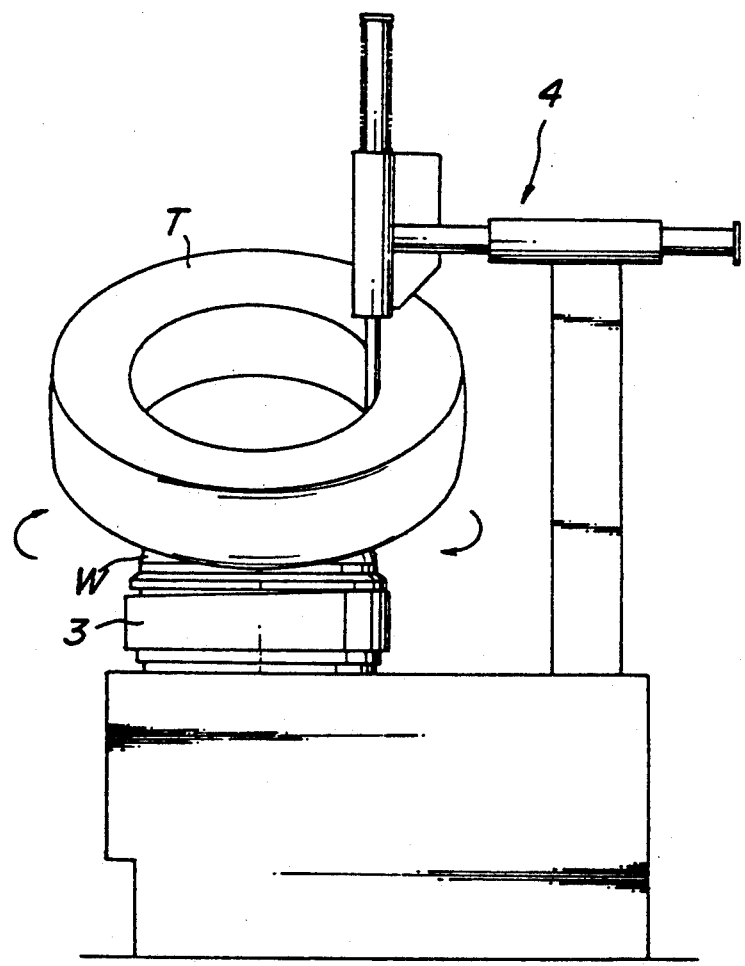
FIG. 8 is an explanatory view of the further step of the tire-wheel assembling and inner pressure filling operation according to the invention.

Thereafter, the tiltable arm 4d of the tire mounting means 4 is returned to the initial vertical position and the first and second pneumatic cylinders 4c and 4e are actuated to position the pawl 4a to be spaced a predetermined distance K (approximately 5 mm) from the edge of the rim flange of the wheel W as shown in FIG. 6. The tiltable arm 4d is then tilted again and a tire T is arranged on the wheel W fixed to the wheel table 1 as shown in FIG. 7. The tiltable arm 4d is then returned to the vertical position again and the wheel table 1 is rotated by means of driving means (not shown) as illustrated in FIG. 8.

Figure 9:
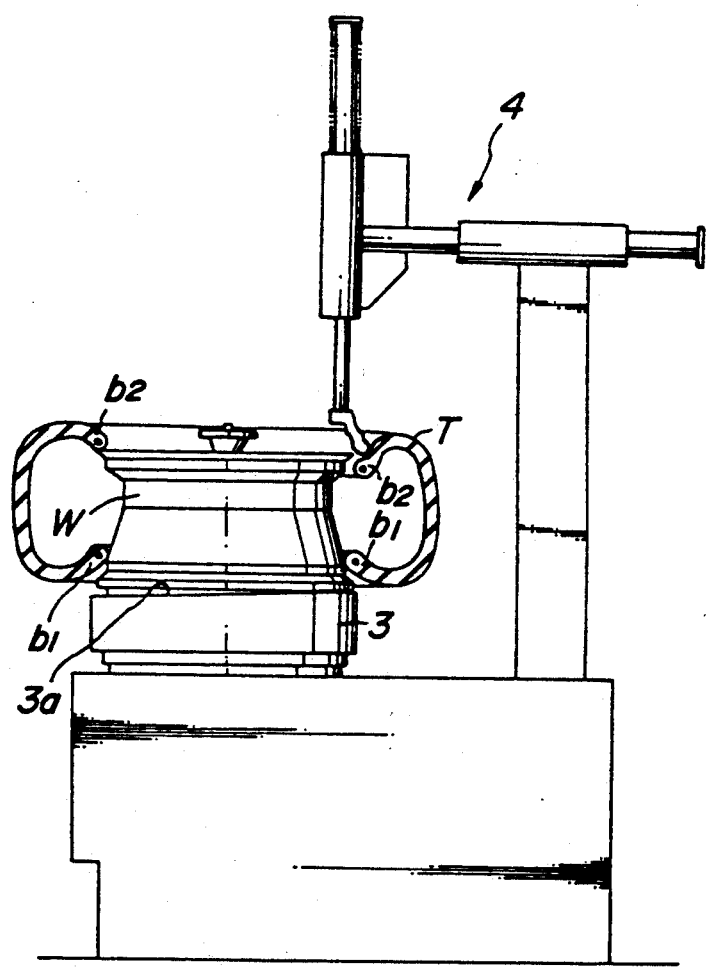
FIG. 9 is an explanatory view of the next step of the tire-wheel assembling and inner pressure filling operation according to the invention.

In this state, the pawl 4a of the tire mounting means 4 is positioned between one bead portion $b_1$ and the wheel W. Therefore, by rotating the wheel table 1, the bead portion $b_1$ is expanded radially outward by the pawl 4a so as to be dropped onto the rim of the wheel W over the circumference of the bead portion $b_1$. FIG. 9 illustrates the state of the tire T in which the whole bead portion $b_1$ is loosely arranged around the rim of the wheel W. In order to adapt the other bead portion $b_2$ of the tire T onto the wheel W, the wheel table 1 is rotated again, while the pawl 4 is maintained in its present position.

After the tire is loosely mounted on the wheel W in this manner, the annular outer cylinder member 3 having the inclined portion 3a at its upper edge is moved against the bead portion $b_1$ of the tire T to form a clearance $t_1$ between the wheel W and the bead portion $b_1$. Pressurized air is then supplied through the air supply tube 3c provided on the outer cylinder member 3 to fill the inner pressure into the tire through the clearances t and $t_1$. After the tire has been sufficiently filled with the pressurized air, the outer cylinder member 3 is progressively lowered as shown in FIG. 11.

During such operations, as the inclined portion 3a of the outer cylinder member 3 is inclined, first the part of the bead portion $b_1$ corresponding to the lowest edge of the inclined portion 3a, where contact pressure is lowest, rides on the bead seat r of the wheel W and then the remaining bead portion $b_1$ progressively rides on the bead seat r of the wheel W. When the inclined portion 3a of the outer cylinder member 3 has just been out of contact with the bead portion $b_1$ of the tire T as shown in FIG. 12, the whole circumference of the bead portion $b_1$ close contacts the bead seat r of the wheel W.

The difference U (FIG. 12) between the maximum and minimum heights of the inclined portion 3a of the outer cylinder member 3 is preferably more than 10 mm because the width of the bead seat is of the order of 10 mm. However, when the outer circumferential length of the inclined portion 3a is excessively large, it becomes difficult to fit the bead portion uniformly onto the bead seat. Therefore, the difference U is preferably of the order of 10 to 20 mm.

Figure 13:
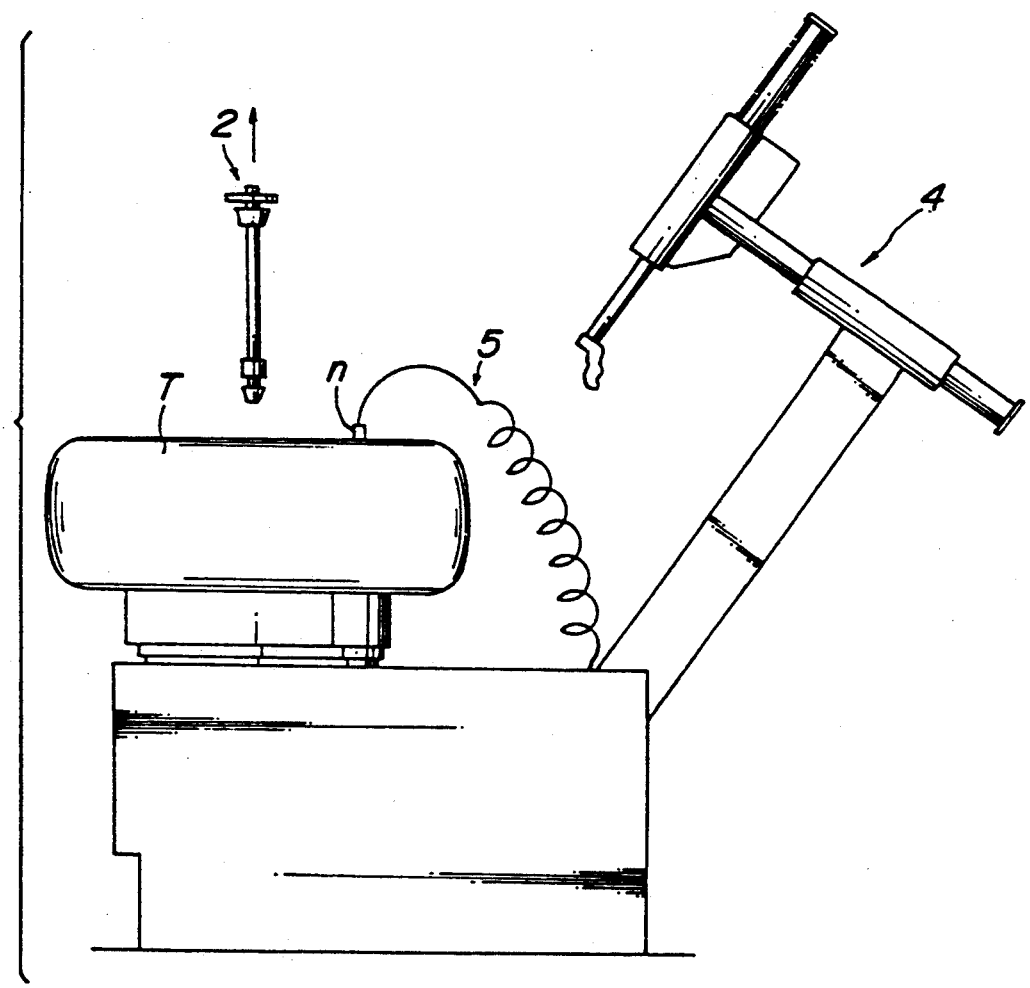
FIG. 13 is a view illustrating the state filling with pressurized air into the tire after assembling it on the wheel according to the invention.
Figure 14:
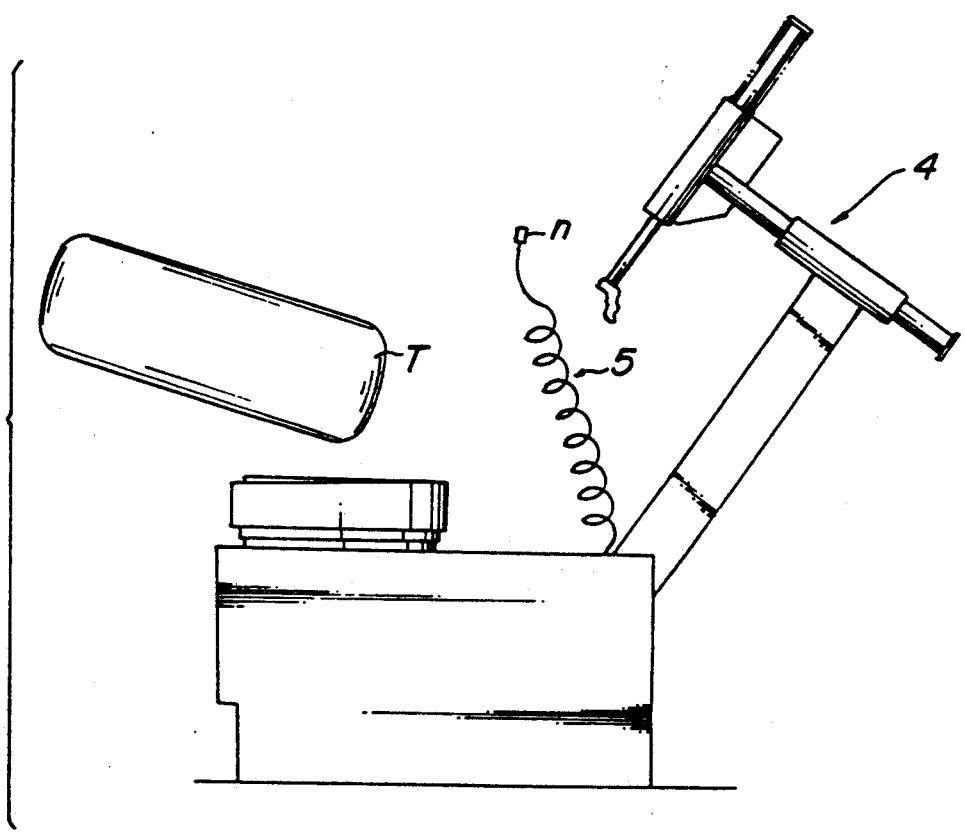
FIG. 14 is a view illustrating the state of the tire after completion of the tire-wheel assembling and inner pressure filling operation according to the invention.

After removing the fixing means 2, the nozzle n of the air injection means 5 is connected to the inflation valve of the wheel W to fill in the tire an inner pressure higher than the normal inner pressure as shown in FIG. 13. Thereafter, the inner pressure is lowered to the normal pressure to complete the operations of assembling the tire and wheel and filling the inner pressure in the tire as shown in FIG. 14.

Although the pawl 4 of the tire mounting means 4 is shown maintained at a fixed position and the table 1 is being rotated to arrange the bead portion around the rim in the illustrated embodiment, it will be apparent that the wheel table 1 may be stationary, while the pawl 4 of tire mounting means 4 may be rotated. In this case, however, it may be needed to take care to avoid a bulkiness of the apparatus in the vertical direction. Moreover, while the wheel table 1 is shown in an integral construction in FIG. 3, the upper portion thereof supporting the wheel may be separable from its main body, which can provide for wheels and tires of various sizes.

As described above, in assembling a tire and a wheel according to the invention, the tire is arranged on the wheel located on the wheel table 1 and then the wheel table is rotated to arrange the tire bead portions around the rim of the wheel. Therefore, it is possible to assemble the tire on the wheel without exerting any excessive force onto the bead portion so that there is no risk of damage to the bead portions and wheel in assembling according to the invention.

In filling with inner pressure according to the invention, the bead portions can be progressively brought into close contact with the bead seats of the wheel with the aid of the inclined portion 3a of the outer cylinder member 3. Therefore, any high pressure is not needed so that the bead portions are not fitted in a deformed state on the rims of the wheel. Particularly, even with tires collapsed due to being piled up, they can be assembled on wheels and filled with inner pressure with great certainty. Moreover, after filling the inner pressure with the aid of such outer cylinder member 3, the tire is once kept with the inner pressure higher than the normal inner pressure by supplying the pressurized air through the inflation valve of the wheel W, with the result that even if the bead portions of the tire are not completely uniformly fitted on the wheel, they are brought into uniform contact with the bead seats of the wheel along all the circumferences of the bead portions.

Moreover, the apparatus according to the invention is able to fill the inner pressure into the tire in the state immediately after having been assembled around the wheel, so that the operations for assembling and inner pressure filling can be effected in a very short time without requiring a widely space occupied by plural apparatuses. The invention enables the apparatus for this purpose to be simplified in construction, and hence be compacted and easy in maintenance and rugged and durable in use.

In order to confirm the effect of the invention, thirty tires of 195/60R14 were assembled on wheels of 14-6JJ and filled with inner pressure by the use of the apparatus shown in FIGS. 1a and 1b according to the invention, respectively and deflections of rim lines of the tires were measured. The tires were filled with inner pressure of 0.5 kgf/cm$^2$ through the air supply tube 3c to set the bead portions b$_1$ and b$_2$ on the bead seats r of the wheels. The inner pressure was then temporarily pressurized to 3.0 kgf/cm$^2$ by supplying pressurized air through the nozzle n, and the inner pressure was lowered to the normal pressure of 2.0 kgf/cm$^2$.

Figure 15A:
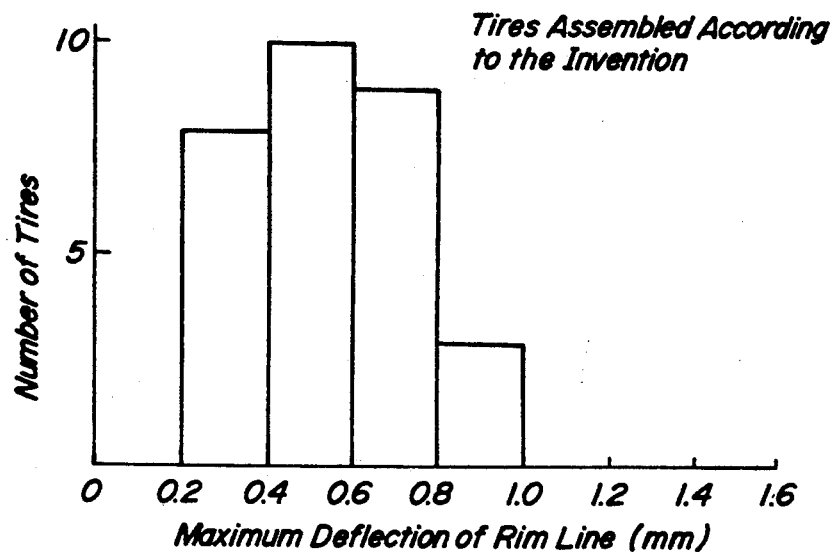
FIG. 15a is a graph illustrating the relation between the numbers of tires and deflections of rim line of the tires assembled and filled with the inner pressure by the use of the apparatus according to the invention.
Figure 15B:
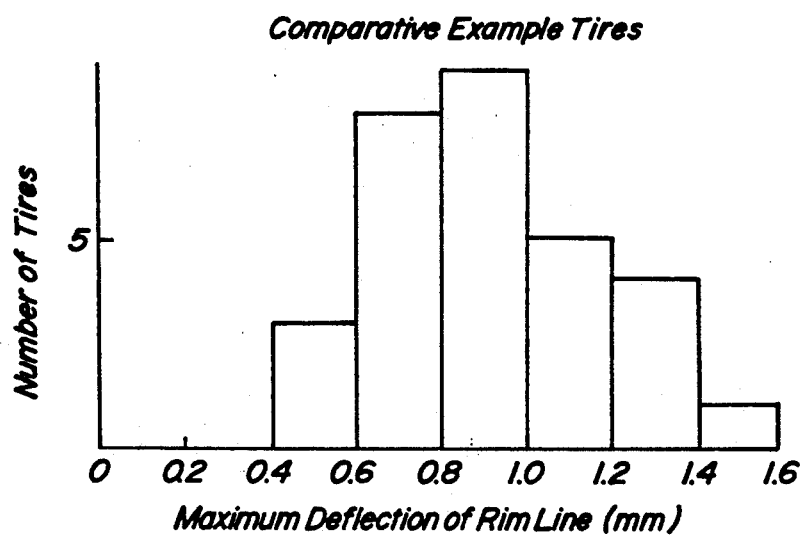
FIG. 15b is a graph illustrating the relation between the numbers of tires and deflections of rim line of the tires assembled and filled with the inner pressure by the use of the apparatuses of the prior art.

The results are shown in FIG. 15a in comparison with the results illustrated in FIG. 15b whose tires were assembled on wheels and filled with inner pressures according to the prior art. Referring to FIGS. 15a and 15b, it is clear that the roundness of the tires assembled on the rims according to the invention are greatly improved from those of the tires assembled by the prior art.

As can be seen from the above explanation, according to the invention a tire can be assembled on a wheel and filled with inner pressure simply and rapidly without damaging the bead portions of the tire and the wheel. Moreover, the apparatus according to the invention is simple and compact in construction without requiring a wide space occupied by the apparatus and is inexpensive to manufacture and easy in maintenance. This apparatus is particularly very useful as a garage type apparatus for assembling a tire and a wheel and filling inner pressure into the tire.

While the invention has been particularly shown and described with reference to preferred embodiments thereof, it will be understood by those skilled in the art that the foregoing and other changes in form and details can be made therein without departing from the scope of the claims.

What is claimed is:

1. A method for assembling a tire having a pair of bead portions and a wheel and filling inner pressure in the tire, comprising steps of holding and fixing onto a wheel table the wheel whose one end surface is held in an airtight manner, arranging the tire on a free end of the wheel remote from the wheel table so that part of one bead portion of the tire is loosely dropped into a well of the wheel, arranging a pawl between the wheel and the one bead portion of the tire, establishing relative rotation between the pawl and the wheel to relatively move the pawl along the circumference of the wheel so that the bead portions of the tire are progressively radially outwardly expanded to arrange the bead portions around a rim of the wheel along all their circumferences, causing an annular outer cylinder member extendable and retractable toward and away from the tire and having at its forward end an inclined portion for filling inner pressure in the tire to abut against the one bead portion of the tire arranged around the rim of the wheel to form a clearance between the wheel and the one bead portion, supplying pressurized air into the interior of the tire through the clearance between the wheel and the one bead portion, progressively retracting the outer cylinder member from this state away from the tire to bring the bead portions into close contact with bead seats of the wheel, after that injecting pressurized air into the tire through the inflation valve of the wheel to raise the inner pressure of the tire higher than a normal pressure, and lowering the inner pressure of the tire to the normal pressure.

2. An apparatus for assembling a tire and a wheel and filling inner pressure into the tire, comprising a wheel table for arranging thereon the wheel on which the tire is assembled, the wheel table having rotating means for rotating the wheel table together with the wheel thereon, fixing means for holding and fixing the wheel on the wheel table, sealing means between the wheel table and one end surface of the wheel to provide air tight engagement therebetween, an annular outer cylinder member mounted for vertical movement and surrounding the wheel table to form a clearance between the wheel table and the outer cylinder member, the outer cylinder member having an inclined portion at one end thereof for contacting a bead portion of the tire, means for vertically moving the outer cylinder member to engage said bead portion of the tire to form a clearance between the wheel and said bead portion of the tire, means for supplying pressurized air through said clearances into the tire, tire mounting means having a pawl for progressively arranging bead portions of the tire around a rim of the wheel held and fixed to the wheel table, the tire mounting means having moving means for moving the pawl substantially in vertical and horizontal directions and air injection means for injecting pressurized air through an inflation valve of the wheel.

3. The apparatus as set forth in claim 2, wherein said fixing means comprises a taper cone having a taper portion to be fitted in a hub aperture of the wheel and a through-aperture at the center, a fixing rod to be inserted in the through-aperture of the taper cone and having at a front end of the rod an engaging portion and at a rear end of the rod a stopper to contact the taper cone, and a block rotatably held through a bearing on an operating end of a cylinder arranged on a frame of the wheel table, said block having anchoring pieces pivotally connected thereto for embracing the engaging portion of the fixing rod inserted in the through-aperture of the taper cone.

4. The apparatus as set forth in claim 2, wherein said moving means of said tire mounting means comprises a vertical arm for holding the pawl, a first cylinder for vertically moving the vertical arm together with the pawl, a second cylinder for horizontally moving the first cylinder together with the pawl, and a tiltable arm for holding the second cylinder.

* * * * *